United States Patent [19]

Ichii et al.

[11] Patent Number: 5,513,175
[45] Date of Patent: Apr. 30, 1996

[54] MULTIPLEX TRANSMISSION APPARATUS

[75] Inventors: Eiji Ichii; Hiroo Moriue; Yutaka Matsuda, all of Hiratsuka, Japan

[73] Assignee: The Furukawa Electric Co., Ltd., Tokyo, Japan

[21] Appl. No.: 417,841

[22] Filed: Apr. 6, 1995

[30] Foreign Application Priority Data

Apr. 13, 1994 [JP] Japan .................................. 6-074678

[51] Int. Cl.⁶ .............................. H04J 3/14; H04L 12/40
[52] U.S. Cl. .......................... 370/17; 370/85.1; 455/343; 340/825.16
[58] Field of Search ................... 370/13, 17, 79, 370/85.1, 85.7; 307/10.1; 340/825.06, 825.16; 455/38.3, 343

[56] References Cited

U.S. PATENT DOCUMENTS

| | | | |
|---|---|---|---|
| 4,907,222 | 3/1990 | Slavik | 370/85.7 |
| 4,942,571 | 7/1990 | Möller et al. | 370/85.1 |
| 4,987,317 | 1/1991 | Pournain et al. | 455/343 |
| 5,251,211 | 10/1993 | Mutoh et al. | 370/85.1 |

*Primary Examiner*—Hassan Kizou
*Attorney, Agent, or Firm*—Frishauf, Holtz, Goodman, Langer & Chick

[57] ABSTRACT

A multiplex transmission apparatus includes a communication control circuit, which monitors data output from an output port and which changes the state of the output port to a predetermined specific state when at least part of the monitored data fails to show a predetermined periodic change with respect to corresponding data previously output, and is operated by a power supply voltage applied thereto from a power circuit to carry out data communications with other multiplex transmission apparatuses. A communication IC maintains the operating state of or resets the output port and the communication control circuit of the multiplex transmission apparatus in accordance with the result of detection by a low-voltage detecting circuit, and a gate circuit inhibits the output port from being changed to the specific state by a timer IC when low voltage is detected or during sleep mode.

6 Claims, 12 Drawing Sheets

MULTIPLEX TRANSMISSION APPARATUS

BACKGROUND THE INVENTION

1. Field of the Invention

This invention relates to a multiplex transmission apparatus connected to other multiplex transmission apparatuses by a common transmission line to construct a multiplex transmission system for carrying out data communications among the multiplex transmission apparatuses.

2. Description of the Related Art

Figure 12:
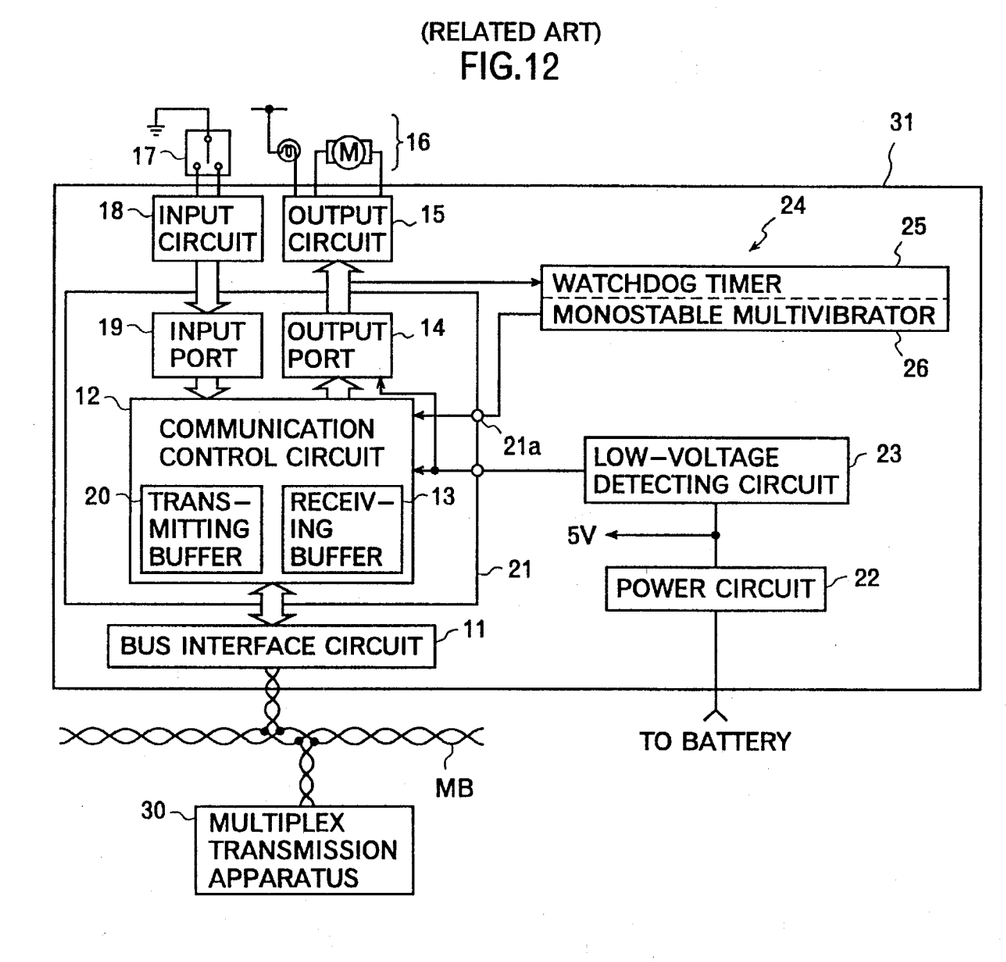
FIG. 12 is a block diagram showing the arrangement of a multiplex transmission apparatus (RELATED ART).

Multiplex transmission apparatuses of this type include the one shown in FIG. 12 (RELATED ART). As shown in FIG. 12, a multiplex transmission apparatus 10 comprises a bus interface circuit 11, a communication control circuit 12, a receiving buffer memory (hereinafter merely referred to as "receiving buffer") 13, an output port 14 including a latch circuit etc., an output circuit 15, loads 16 such as motors, lamps and the like, loads 17 such as various switches, an input circuit 18, an input port 19, a transmitting buffer memory (hereinafter merely referred to as "transmitting buffer") 20, a power circuit 22, a low-voltage detecting circuit 23, and a timer IC 24 including a watchdog timer 25 and a monostable multivibrator 26. The communication control circuit 12, the output port 14 and the input port 19 are constituted by a single communication IC 21.

The multiplex transmission apparatus 10 is connected to a transmission line MB of a multiplex transmission system through the bus interface circuit 11. Frames of data are transferred via the transmission line (bus) MB among a plurality of multiplex transmission apparatuses 10, 30, etc.

The multiplex transmission apparatus 10 is supplied with electric power from an external battery, and a power supply voltage of 5V is applied to the individual internal circuits by the power circuit 22. The low-voltage detecting circuit 23 is connected to the power circuit 22 and the communication control circuit 12 of the communication IC 21. On detecting a drop of the power supply voltage to a predetermined voltage value at which the multiplex transmission apparatus cannot operate normally, the low-voltage detecting circuit 23 provides an output so as to reset the entire communication IC 21, thereby preventing erroneous operation of the multiplex communication apparatus.

As a measure of the multiplex transmission apparatus 10 against abnormality of the transmission system, the watchdog timer 25 of the timer IC 24 is supplied with data from at least one specific output port, for example, data which periodically and alternately turns to high (hereinafter "H") and low (hereinafter "L") levels, among a plurality of data items output from the output port 14.

The watchdog timer 25 monitors the repetition periods of the "H" and "L" levels input thereto by their trailing edges from "H" to "L" level, and in the event of an improper period being detected, the timer 25 outputs a reset signal. Thus, the multiplex transmission apparatus 10 is constructed so that the transmission system may not operate erroneously in case of abnormality.

When the signal monitored is abnormal, the watchdog timer 25 outputs the reset signal which alternately turns to "H" and "L" levels at predetermined intervals, but this pulse width is varied by the monostable multivibrator 26 incorporated in the timer IC 24.

The monostable multivibrator 26 sets a circuit constant such that the "L"-level pulse lasts for a predetermined length from the trailing edge of the reset signal from "H" to "L" level. Accordingly, in the event abnormality occurs, the timer IC 24 outputs a continuous "L"-level signal with a fixed length. This "L"-level signal is supplied to the communication control circuit 12 via an input terminal 21a of the communication IC 21.

On detecting the "L" state of the output from the timer IC 24, the communication control circuit 12 judges that the transmission system is in an abnormal state. Then, the communication control circuit 12 immediately brings part or all of the output port 14 to a predetermined specific state, for example, high-impedance state, to thereby keep the loads connected to the output port 14 safe.

When the transmission system is recovered to normal state, the output of the timer IC 24, which has been in the "L" state after the occurrence of abnormality, must be changed to "H" level so that the output port 14, which is in the specific state, can output data normally. Namely, the specific output port must be set again so as to output data which periodically and alternately turns to "H" and "L" levels.

The specific output port is not brought to high-impedance state even when the input terminal of the communication IC 21 is in the "L" state, because data should be output as soon as frame reception becomes available.

In multiplex transmission apparatuses, a power supply voltage threshold (hereinafter referred to as "reset voltage") used for avoiding erroneous operation is set to a voltage at which even part of the circuitry in the apparatus may possibly fail to operate normally. Where the multiplex transmission apparatus is used in a multiplex transmission system for an automotive electrical system, for example, a large quantity of electric current flows during rotation of the starter motor at the startup of the engine (hereinafter referred to as "cranking") or in similar conditions, and accordingly, the battery voltage lowers. As a result, the power supply voltage may drop to the reset voltage.

In such cases, in the multiplex transmission apparatus, an "L"-level signal is supplied from the timer IC 24 to the input terminal 21a of the communication IC 21; therefore, the communication control circuit 12 is reset and thus becomes unable to receive data. Since in this case the output of the specific output port does not alternately turn to "H" and "L" levels, the watchdog timer 25 outputs the reset signal. Consequently, the timer IC 24 outputs an "L"-level signal, and the state of the output port changes to high-impedance state which is the predetermined specific state.

In a system wherein headlamps as the loads 16, for example, are driven by the multiplex transmission apparatus 10, the output port is pulled up so that no danger may be incurred by potential operation of the loads in case of abnormality. Further, the system may be constructed in such a manner that when the output port changes to the high-impedance state, the headlamps are lighted. In this case, however, the headlamps are uselessly lighted every time the engine is started.

Furthermore, in the case where the multiplex transmission apparatus is used in a multiplex transmission system for an automotive electrical system, certain functions such as the door locking/unlocking function must be available even while the ignition switch is off. In some systems, therefore, while the ignition switch is off, a power economy mode (hereinafter referred to as "sleep mode") is executed in which the operation is stopped and only changes in the input switch signals are monitored, to thereby reduce the load on the battery and thus the electric current consumed. Even in such systems, since the operation is stopped while the ignition switch is off, application of the signal (alternate "H"-and-"L" signal) to the watchdog timer also ceases. Consequently, the timer IC outputs an "L"-level signal, which brings the output port to the specific state.

SUMMARY OF THE INVENTION

This invention was created in view of the above circumstances, and an object thereof is to provide a multiplex transmission apparatus capable of preventing erroneous operation when low voltage is detected or during sleep mode.

Another object of this invention is to inhibit at least one of output ports from changing to a predetermined specific state when low voltage is detected or during sleep mode.

The above objects are achieved by a multiplex transmission apparatus according to this invention. The multiplex transmission apparatus is connected to another multiplex transmission apparatus by a common transmission line, has communication control means for controlling reception of frames which are successively transmitted thereto from the other multiplex transmission apparatus and in which at least part of predetermined data shows a predetermined periodic change, and for outputting the predetermined data in the received frames to an output port, and is operated by a power supply voltage from power supply means for applying the power supply voltage to individual parts in the multiplex transmission apparatus, to carry out data communications with the other multiplex transmission apparatus. The multiplex transmission apparatus further comprises state setting means for detecting the power supply voltage and setting the states of the output port and communication control means individually to an initial state in accordance with the result of detection; state control means for monitoring at least part of the predetermined data output from the output port, and changing the state of the output port to a predetermined specific state when at least part of the predetermined data being monitored does not show a predetermined change with respect to corresponding data previously output; and inhibiting means for inhibiting the state control means from changing the state of the output port in accordance with the detection result derived from the state setting means.

In this multiplex transmission apparatus, the operating states of the individual parts (output port and communication control circuit) of the multiplex transmission apparatus are maintained or reset and the inhibiting means inhibits the output port from changing to the specific state, in accordance with the relation of the power supply voltage with a preset voltage. When a detection signal is output from the state setting means, the signal output from the state control means is invalidated, thereby preventing erroneous operation of the multiplex transmission apparatus attributable to a drop in the power supply voltage.

Preferably, the multiplex transmission apparatus has operation modes including a power economy mode (sleep mode) in which the operation of the communication control means is stopped and a normal operation mode in which the communication control means is operated, and the inhibiting means inhibits the output port from changing to the specific state also when the multiplex transmission apparatus is in the power economy mode.

The multiplex transmission apparatus preferably includes first state setting means for detecting a first voltage level of the power supply voltage, and for maintaining the operating state of the output port while setting the state of the communication control means to an initial state in accordance with the detection result; second state setting means for detecting a second voltage level of the power supply voltage, and for setting the state of each of the output port and the communication control means to an initial state in accordance with the detection result; state control means for monitoring at least part of the predetermined data output from the output port, and for changing the state of the output port to a predetermined specific state when the monitored part of the predetermined data does not show a predetermined change with respect to corresponding data previously output; and inhibiting means for inhibiting the state control means from changing the state of the output port in accordance with the detection result derived from the first state setting means.

In this multiplex transmission apparatus, when a detection signal is output from the first state setting means, the output signal from the state control means is invalidated, and when a detection signal is output from the second state setting means, the output port and the state control means are both set to their initial state, thereby permitting continuous control of loads without incurring erroneous operation of the multiplex transmission apparatus.

Preferably, the first state setting means determines whether the power supply voltage is at a level lower than or equal to the first voltage level at which the communication control means is unable to operate normally and which is higher than the second voltage level; the second state setting means determines whether the power supply voltage is at a level lower than or equal to the second voltage level at which neither the output port nor the communication control means can operate normally; and the inhibiting means inhibits the state control means from changing the state of the output port when the power supply voltage is higher than or equal to the second voltage level and at the same time lower than or equal to the first voltage level.

The multiplex transmission apparatus preferably has operation modes including a power economy mode in which the operation of the communication control means is stopped and a normal operation mode in which the communication control means is operated, and the inhibiting means inhibits the output port from changing to the specific state also when the multiplex transmission apparatus is in the power economy mode.

Preferably, the multiplex transmission apparatus has operation modes including a power economy mode and a normal operation mode, and comprises power supply means for applying a power supply voltage to individual parts in the multiplex transmission apparatus; communication control means, the operation of which is stopped during the power economy mode to reduce electric current consumption, and which is operated during the normal operation mode by the power supply voltage applied thereto from the power supply means, the communication control means controlling reception of frames which are successively transmitted thereto from another multiplex transmission apparatus and in which at least part of predetermined data shows a predetermined periodic change, and outputting the predetermined data in the received frames to an output port; and inhibiting means for inhibiting the output port from changing to a predetermined specific state during the power economy mode.

According to this multiplex transmission apparatus, during the power economy mode, the output port is held at the state before the stop of a clock (based on the clock pulses from which the communication control means operates), whereby erroneous operation of the multiplex transmission apparatus attributable to the stop of the clock is prevented.

DETAILED DESCRIPTION OF THE PREFERRED EMBODIMENTS

Embodiments according to this invention will be described with reference to FIGS. 1 through 11.

Figure 1:
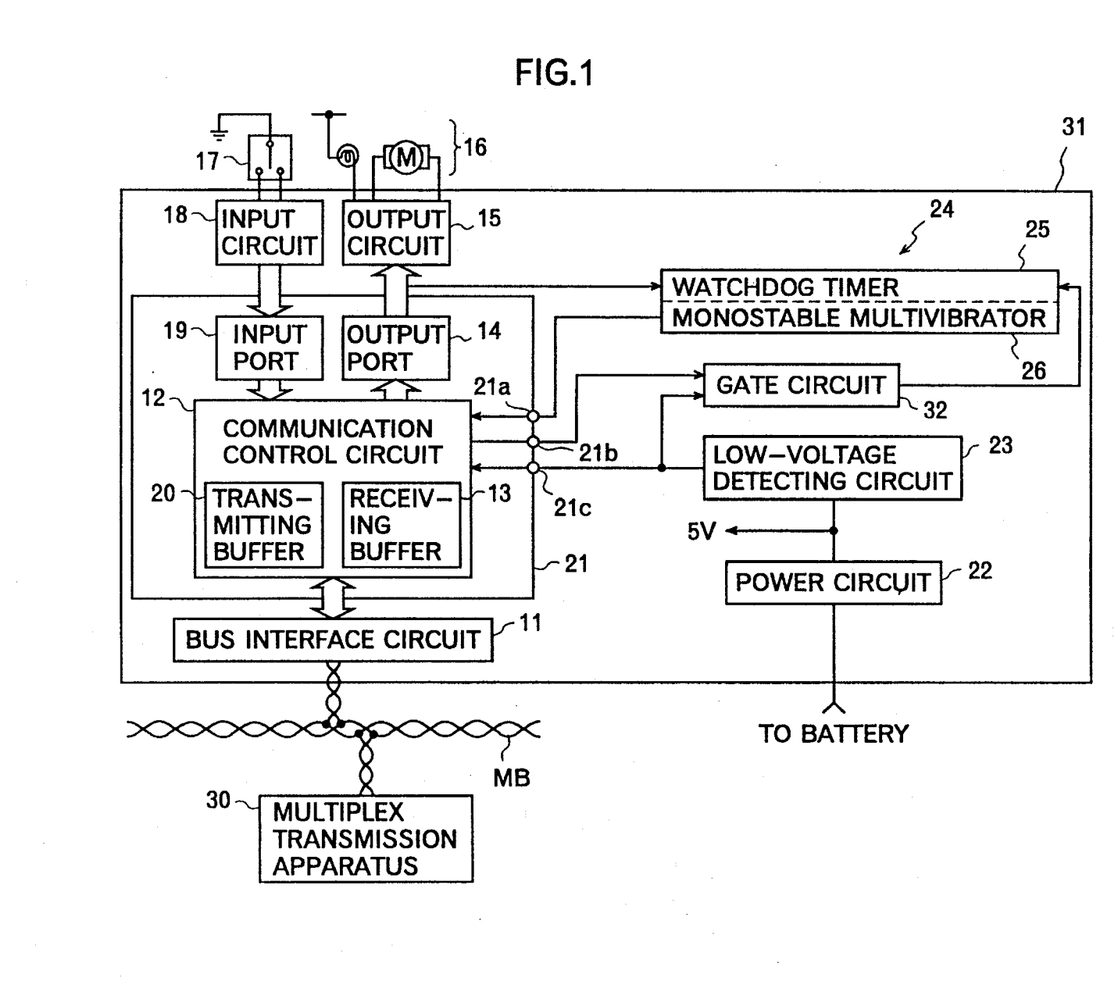
FIG. 1 is a block diagram showing the arrangement of a multiplex transmission apparatus according to a first embodiment of the invention.

FIG. 1 is a block diagram showing the arrangement of a multiplex transmission apparatus according to a first embodiment of the invention. In FIG. 1 and the subsequent figures, like reference numerals are used to denote like component parts shown in FIG. 12 for convenience of explanation.

Referring to FIG. 1, a multiplex transmission apparatus 31 is connected to a transmission line MB through a bus interface circuit 11. Data frames having the format shown in FIG. 2 are transferred among a plurality of multiplex transmission apparatuses 31, 30, etc. via the bus MB.

Figure 2:
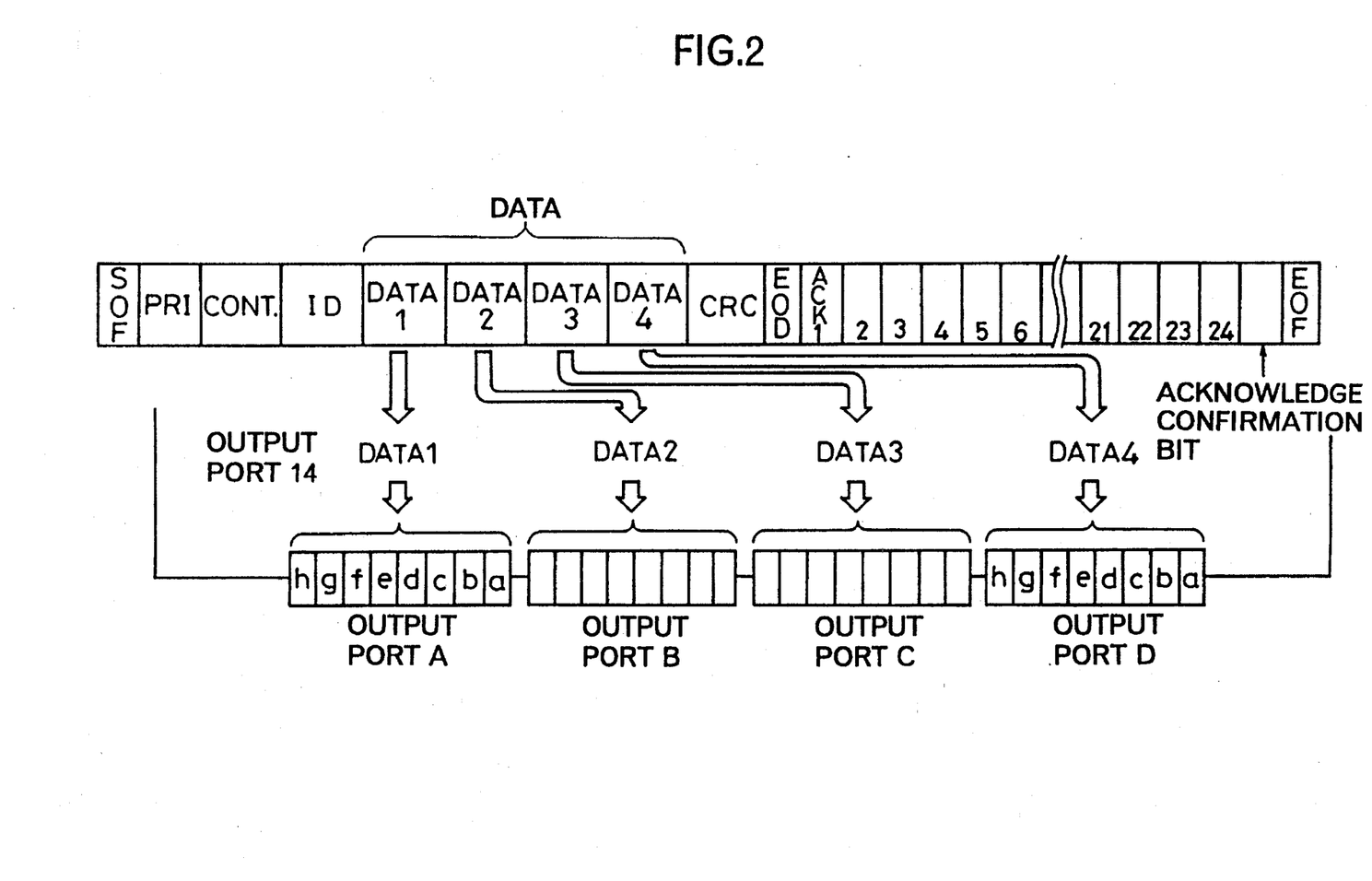
FIG. 2 is a diagram showing, by way of example, a format of a data frame transmitted between multiplex transmission apparatuses and the relationship between received data and output ports.

FIG. 2 illustrates, by way of example, the format of a data frame transmitted between the multiplex transmission apparatuses via the bus MB and the relationship between received data and output ports.

As shown in FIG. 2, the data frame is composed of SOF (Start-Of-Frame), priority (PRI), control data field (CONT), ID, DATA, CRC, EOD (End-Of-Data), reception acknowledgment signal (hereinafter referred to as "ACK signal") field, ACK confirmation bit field, and EOF (End-Of-Frame).

SOF indicates the start of a frame, and PRI is used to determine the order of priority of frames in cases where a plurality of multiplex transmission apparatuses simultaneously transmit data onto the bus MB. CONT retains data indicating a data length, and ID represents the contents of the subsequent DATA 1 to DATA 4. DATA is a data field having a length (variable length) specified by CONT and composed of DATA 1 to DATA 4 each consisting of, for example, 8 bits. CRC is an error-checking code, and EOD indicates the end of the data. The ACK signal field is a 24-bit field, for example, to which ACK signals are returned from all multiplex transmission apparatuses in bit-to-bit correspondence. The ACK confirmation bit field consists of one bit which indicates completion of data transmission when ACK signals are returned from all of the recorded multiplex transmission apparatuses. EOF represents the end of the frame.

In the multiplex transmission apparatus 31, when a frame on the bus MB is received through the bus interface circuit 11, the communication control circuit 12 checks the frame to determine, for example, whether an error is contained in the received frame and whether the frame requires data output therefrom. DATA 1 to DATA 4 in the frame are once stored in the receiving buffer 13. The data thus stored are output to corresponding ports of the output port 14 (which is composed of, e.g., four 8-bit ports A to D, as shown in FIG. 2), to drive the loads 16, such as motors and lamps, via the output circuit 15. The communication control circuit 12 also fetches from the input port 19 data in the form of parallel signals which are supplied from the loads 17 such as various switches through the input circuit 18. When one or a plurality of data items input to the input port 19 changes, such data items are once transferred to the transmitting buffer 20. The communication control circuit 12 then creates a frame by incorporating the input data therein according to a predetermined communication procedure, and transmits the frame to the bus MB through the bus interface circuit 11.

The multiplex transmission apparatus 31 of FIG. 1 differs from the apparatus 10 shown in FIG. 12 in that the communication IC 21 has the function of operation mode transition between normal operation mode and sleep mode and switches the operation mode to sleep mode when the conditions for system transition to sleep mode are fulfilled, and that a gate circuit 32 is provided which is supplied with a sleep mode signal and a low-voltage detection signal (hereinafter merely referred to as the "detection signal") and which outputs a reset inhibiting signal.

Specifically, while the communication control circuit 12 is in sleep mode, the communication IC 21 outputs an "H" (high)-level sleep mode signal to the gate circuit 32 from an output terminal 21b thereof. When supplied with an "L" (low)-level signal from the timer IC 24 through the input terminal 21a, the communication IC 21 changes the state of the output port 14 to a predetermined specific state (e.g., high-impedance state).

When an "L"-level detection signal is supplied from the low-voltage detecting circuit 23 to the communication IC 21 through an input terminal 21c serving as a reset terminal, the entire communication IC 21 is reset.

When the input detection signal is "L" (low) or when the sleep mode signal is "H" (high), the gate circuit 32 outputs a reset inhibiting signal to the timer IC 24, to inhibit the watchdog timer 25 from outputting a reset signal.

Figures 3A, 3B:
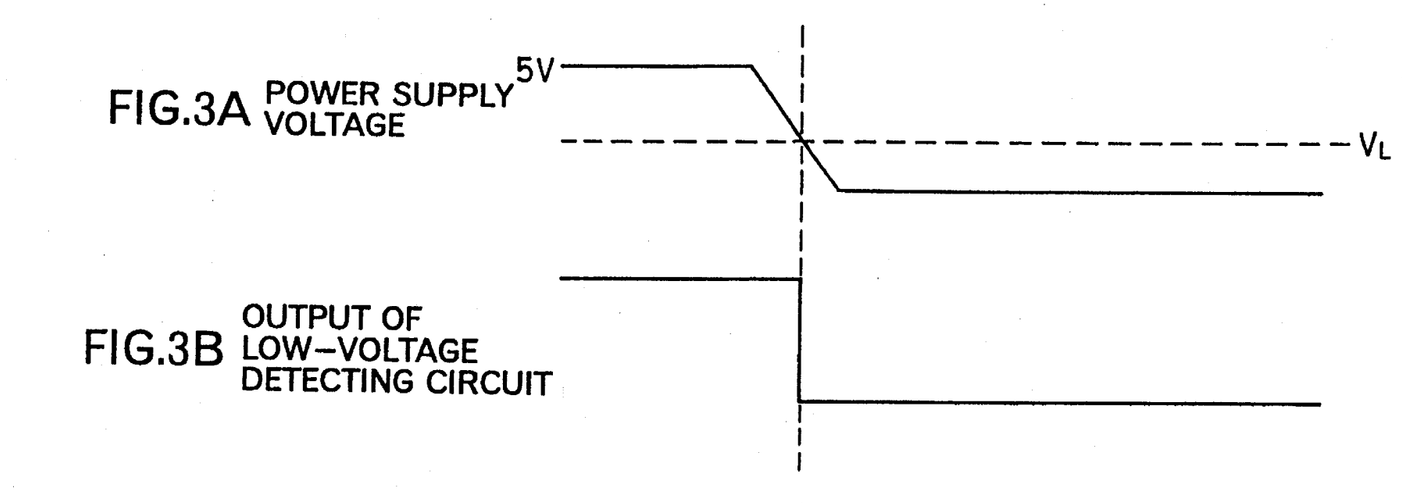
FIGS. 3A and 3B are waveform charts showing a detection output of a low-voltage detecting circuit in FIG. 1.

More specifically, the multiplex transmission apparatus 31 is supplied with electric power from an external battery, and a power supply voltage of 5V is applied to the individual internal circuits by the power circuit 22. The low-voltage detecting circuit 23 is connected to the power circuit 22, the communication control circuit 12 of the communication IC 21, and the gate circuit 32. Upon detecting a drop of the power supply voltage to a predetermined voltage value $V_L$ at which the multiplex transmission apparatus cannot operate normally, as shown in FIG. 3A, the low-voltage detecting circuit 23 provides an output so as to reset the entire communication IC 21, as shown in FIG. 3B.

When the input detection signal is "L" (low), the gate circuit 32 outputs the reset inhibiting signal to the watchdog timer 25 of the timer IC 24. When supplied with the reset inhibiting signal, the watchdog timer 25 is inhibited from outputting the reset signal. Consequently, although the communication IC 21 is reset because it is supplied with an "H"-level signal through the input terminal 21a, the state of the output port 14 is not changed to the high-impedance state, whereby the operating state is maintained.

In this multiplex transmission apparatus 31, to monitor the transmission system for abnormality, the watchdog timer 25 of the timer IC 24 is supplied with data from at least one specific output port, for example, the output from the output port D-a (the least significant bit (LSB) of DATA 4), among a plurality of data items output from the output port 14.

Figure 4A:
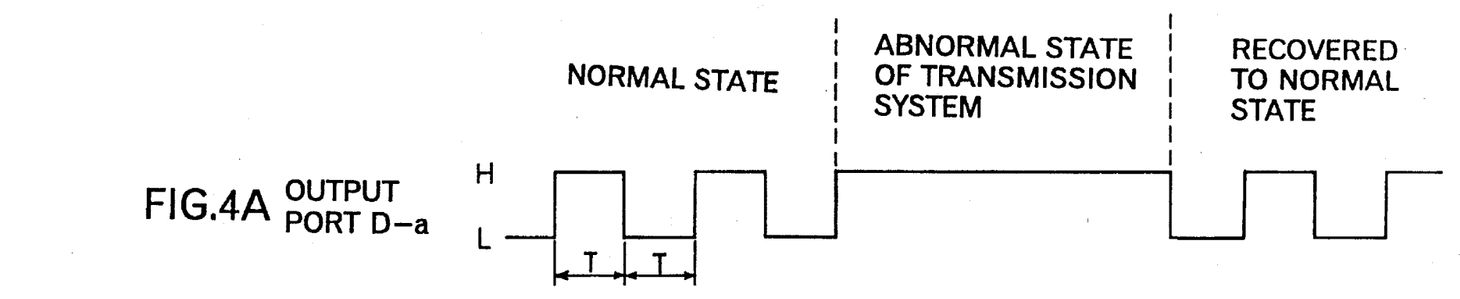
FIGS. 4A and 4B are waveform charts showing an output of a watchdog timer in relation to variation in output port data.

For example, the LSB of DATA 4, which alternately turns to "H" and "L" levels at intervals T of, for example, 100 ms (T=100 ms), is generated by the multiplex transmission apparatus 30 and transmitted to the multiplex transmission apparatus 31, so that the output from the output port D-a of the multiplex transmission apparatus 31 periodically and alternately turns to "H" and "L" levels (see FIG. 4A).

Figure 4B:
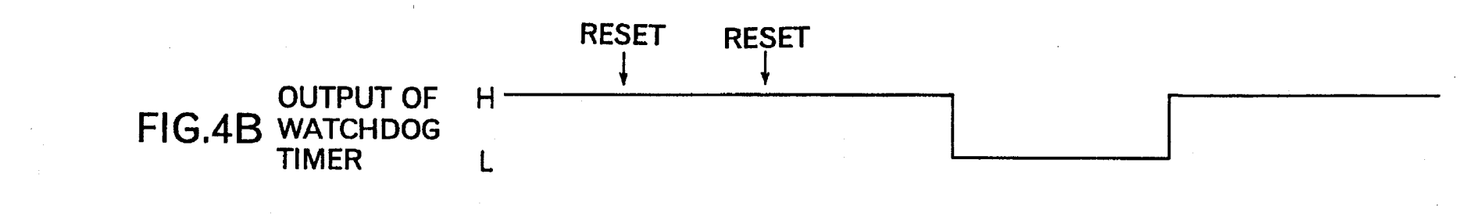

The watchdog timer 25 monitors the repetition periods of the "H" and "L" levels input thereto by their trailing edges from "H" to "L" level, and if an improper period is detected, the timer 25 outputs the reset signal to thereby prevent erroneous operation of the transmission system in case of abnormality (see FIG. 4B).

In general, as shown in FIG. 5, when the monitored signal is abnormal, the watchdog timer 25 outputs a reset signal (see FIG. 5D) which alternately turns to "H" and "L" levels at intervals T2 (T2 is a time preset in the watchdog timer; T2>T1), but this pulse width is varied by the monostable multivibrator 26 incorporated in the timer IC 24 (see FIG. 1). T1 equals 2T shown in FIG. 4.

Figure 5A:
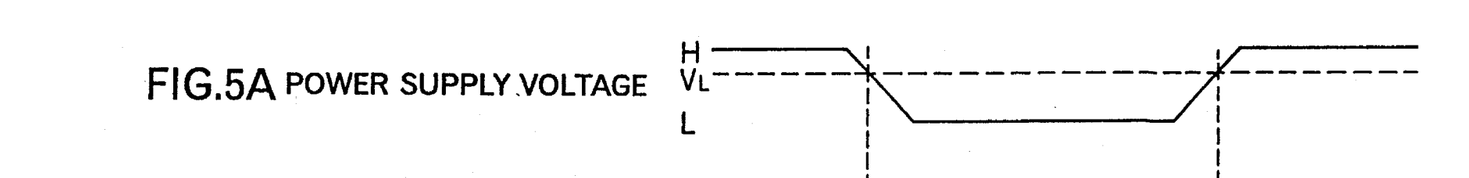
FIGS. 5A to 5F are waveform charts showing outputs from various circuits in FIG. 1.
Figures 5B, 5C:
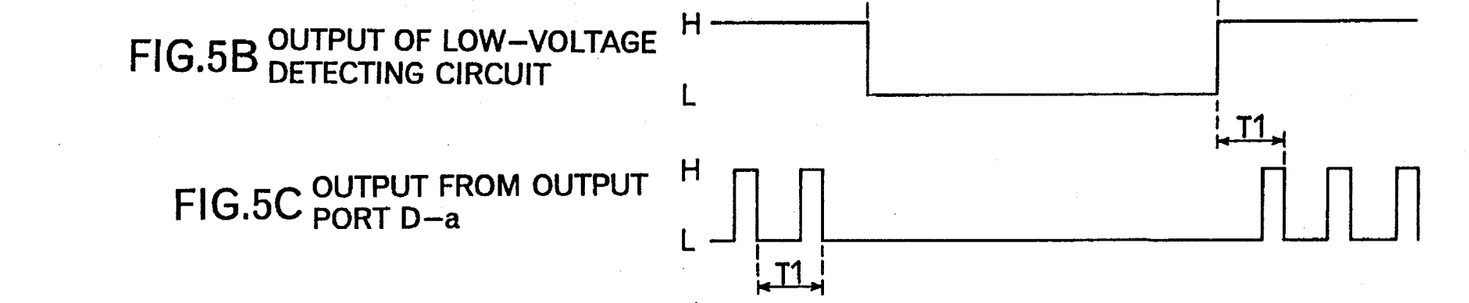
Figure 5D:
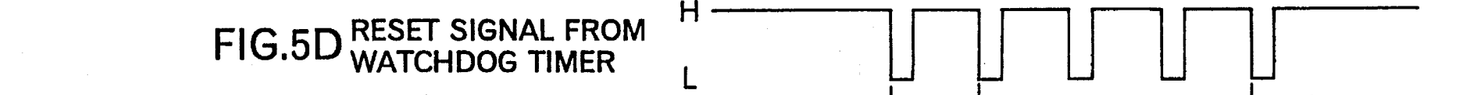
Figure 5E:
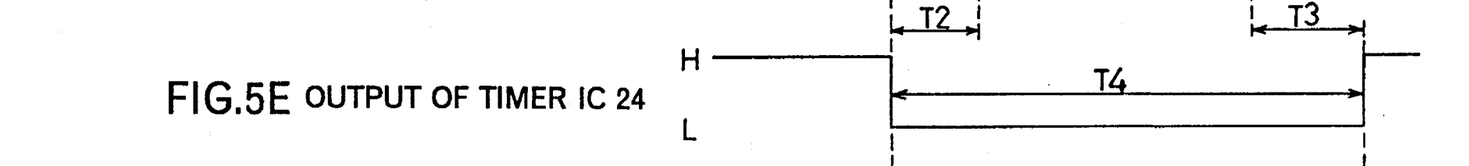
Figure 5F:
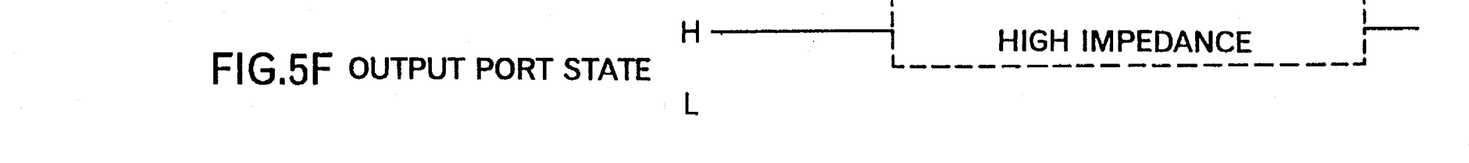

The monostable multivibrator 26 sets a circuit constant such that the "L"-level pulse lasts for a length of T3 after the trailing edge of the reset signal from "H" to "L" level (see FIG. 5D); therefore, in the event of abnormality occurring, the "L"-level pulse continues for a length of T4 (see FIG. 5E). T3 is longer than T2 (T3>T2). The "L"-level output is supplied to the communication control circuit 12 of the communication IC 21 through the input terminal 21a.

On detecting the "L" state of the output from the timer IC 24, the communication control circuit 12 judges that the transmission system is in an abnormal state. Then, the communication control circuit 12 immediately brings part or all of the output port 14 to the predetermined specific state (e.g., high-impedance state) (see FIG. 5F).

While the communication control circuit 12 is in sleep mode, the communication IC 21 outputs an "H"-level sleep mode signal to the gate circuit 32 from the output terminal 21b thereof. When the input sleep mode signal is "H" (high), the gate circuit 32 outputs the reset inhibiting signal to the watchdog timer 25 of the timer IC 24. The reset inhibiting signal inhibits the watchdog timer 25 from outputting the reset signal. Consequently, although the communication IC 21 is reset because it is supplied with an "H" (high)-level signal through the input terminal 21a, the state of the output port 14 is not changed to the high-impedance state, whereby the operating state is maintained.

In this embodiment, during the sleep mode or when the power supply voltage is low but the port output can be retained normally, the gate circuit outputs the reset inhibiting signal to thereby invalidate the output signal of the watchdog timer. Therefore, the communication control circuit can maintain the operating state without changing the state of the output port to the high-impedance state. Thus, in this embodiment, control of the loads can be continued without incurring erroneous operation of the multiplex transmission apparatus.

Figure 6:
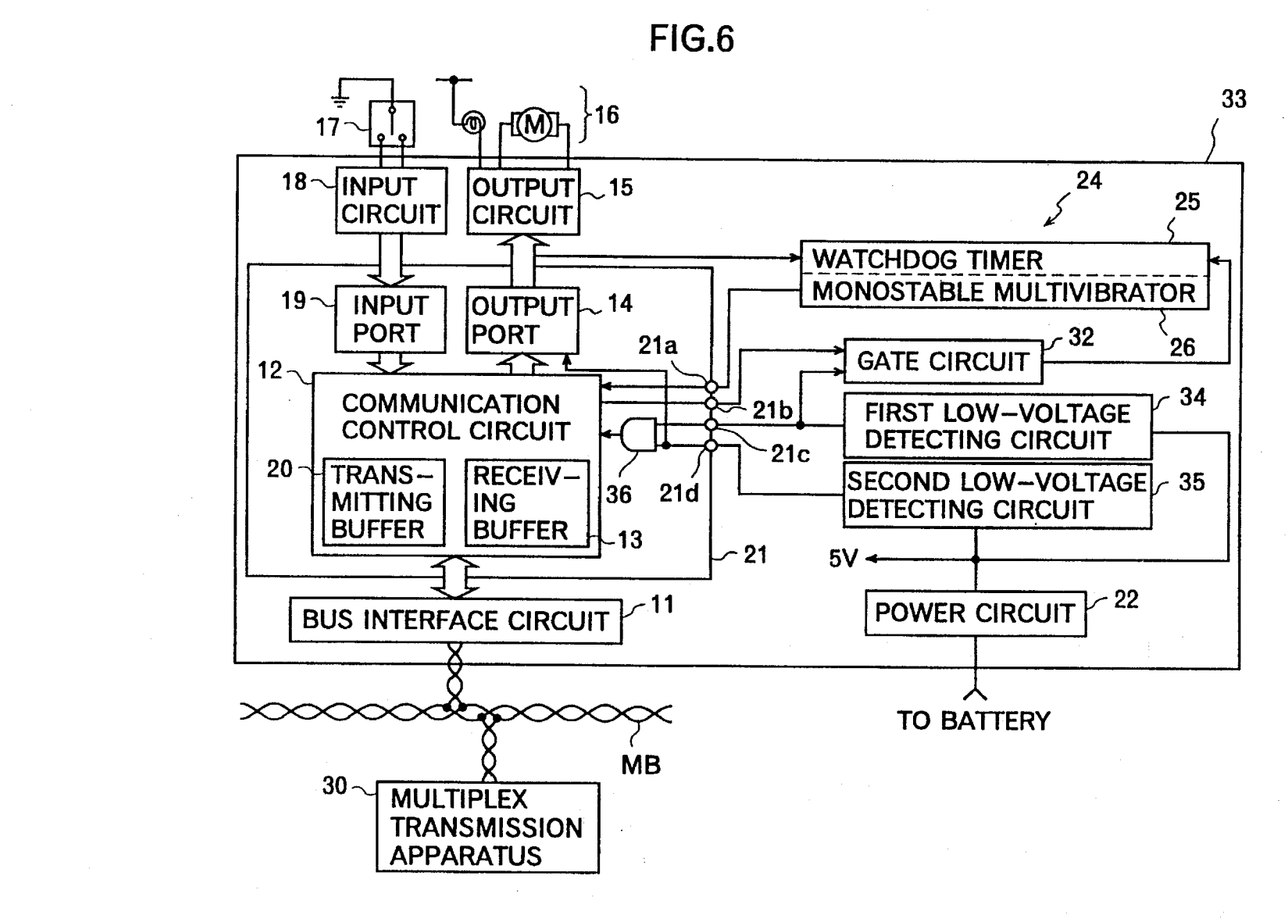
FIG. 6 is a block diagram showing the arrangement of a multiplex transmission apparatus according to a second embodiment of the invention.

FIG. 6 is a block diagram showing the arrangement of a multiplex transmission apparatus according to a second embodiment of the invention.

In multiplex transmission apparatuses in general, the output from the output port can be maintained in a normal state even when the power supply voltage is at the low level $V_L$ at which the communication control circuit may possibly fail to perform normal communication control.

In the second embodiment, therefore, when the power supply voltage is at such a level that the communication control circuit 12 may possibly fail to perform normal communication control but the output port can provide normal output, that is, when voltage $V_L \geq$ power supply voltage > voltage $V_R$, the communication control circuit 12 alone is reset so that the output from the output port 14 can be maintained in normal state. Also, in the second embodiment, when the power supply voltage is at such a level that the entire multiplex transmission apparatus may fail to operate normally, that is, when power supply voltage $\leq$ voltage $V_R$, both the communication control circuit 12 and the output port 14 are reset.

As shown in FIG. 6, the apparatus of the second embodiment includes first and second low-voltage detecting circuits 34 and 35, in place of the single low-voltage detecting circuit shown in FIG. 1, for detecting the power supply voltage from the power circuit 22, input terminals 21c and 21d through which detection signals from the low-voltage detecting circuits 34 and 35 are supplied to the communication IC 21, and an AND circuit 36 incorporated in the communication IC 21 for performing logic operation on the input detection signals.

Figure 7A:
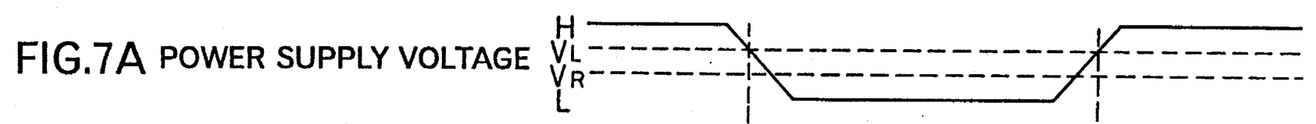
FIGS. 7A to 7F are waveform charts showing outputs from various circuits in FIG. 6.
Figure 7B:
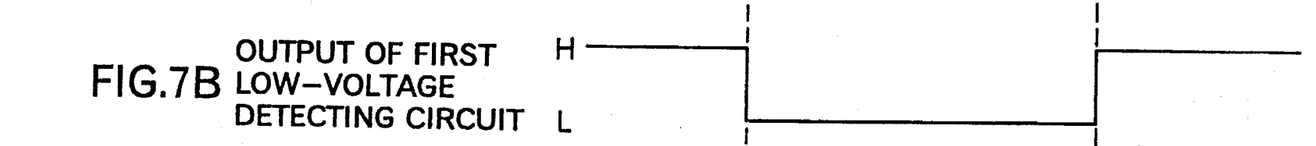
Figure 7C:
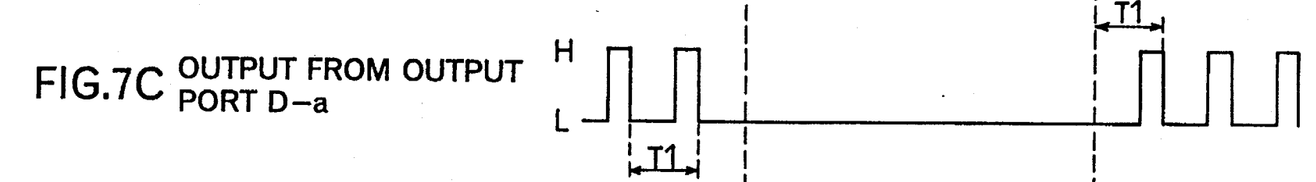
Figure 7D:
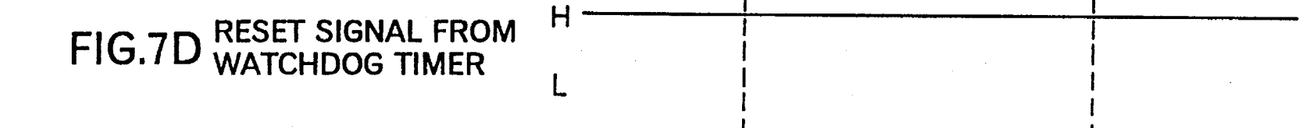

The first low-voltage detecting circuit 34 is connected to the gate circuit 32, and also to the communication control circuit 12 through the input terminal 21c and the AND circuit 36. The first low-voltage detecting circuit 34 determines whether the power supply voltage input thereto has dropped to a value lower than or equal to the set voltage $V_L$ due to abnormal variation in the power supply voltage. When the power supply voltage becomes lower than or equal to the set voltage $V_L$ (see FIG. 7A), the first low-voltage detecting circuit 34 outputs an "L" (low)-level detection signal to the gate circuit 32 and the AND circuit 36. On the other hand, when the power supply voltage becomes higher than the set voltage $V_L$, the first low-voltage detecting circuit 34 outputs an "H" (high)-level detection signal to the gate circuit 32 and the AND circuit 36 (see FIG. 7B).

The second low-voltage detecting circuit 35 is connected directly to the output port 14 through the input terminal 21d, and also connected indirectly to the communication control circuit 12 through the AND circuit 36. The second low-voltage detecting circuit 35 determines whether the power supply voltage input thereto has dropped to a value lower than or equal to the set voltage $V_R$ due to abnormal variation in the power supply voltage. When the power supply voltage becomes lower than or equal to the set voltage $V_R$, the second low-voltage detecting circuit 35 outputs an "L"-level detection signal to the AND circuit 36. On the other hand, when the power supply voltage becomes higher than the set voltage $V_R$, the second low-voltage detecting circuit 35 outputs an "H"-level detection signal to both the output port 14 and the AND circuit 36.

The power supply voltage output from the power circuit 22 is approximately 5V when it is in normal state and is free from variation. In the multiplex transmission apparatus of this embodiment, it is assumed that when the power supply voltage>$V_L$, the entire apparatus can operate normally, when $V_L \geq$ power supply voltage>$V_R$, the output port 14 can provide normal output, and when the power supply voltage$\leq V_R$, neither the communication control circuit 12 nor the output port 14 can operate normally. The set voltages $V_L$ and $V_R$ are in the relationship $V_L > V_R$, and are set to about 4.5V and 2.7V, respectively.

The AND circuit 36 performs an AND operation on the detection signals from the low-voltage detecting circuits 34 and 35, and outputs the result of the AND operation to the communication control circuit 12.

The communication control circuit 12 and the output port 14 are reset when supplied with an "L" -level signal. Specifically, the communication control circuit 12 is reset and initialized where the power supply voltage$\leq V_L$, by the detection output from either the low-voltage detecting circuit 34 or 35. On the other hand, the output port 14 is reset and initialized where the power supply voltage$\leq V_R$, by the detection output from the low-voltage detecting circuit 34.

Figure 8:
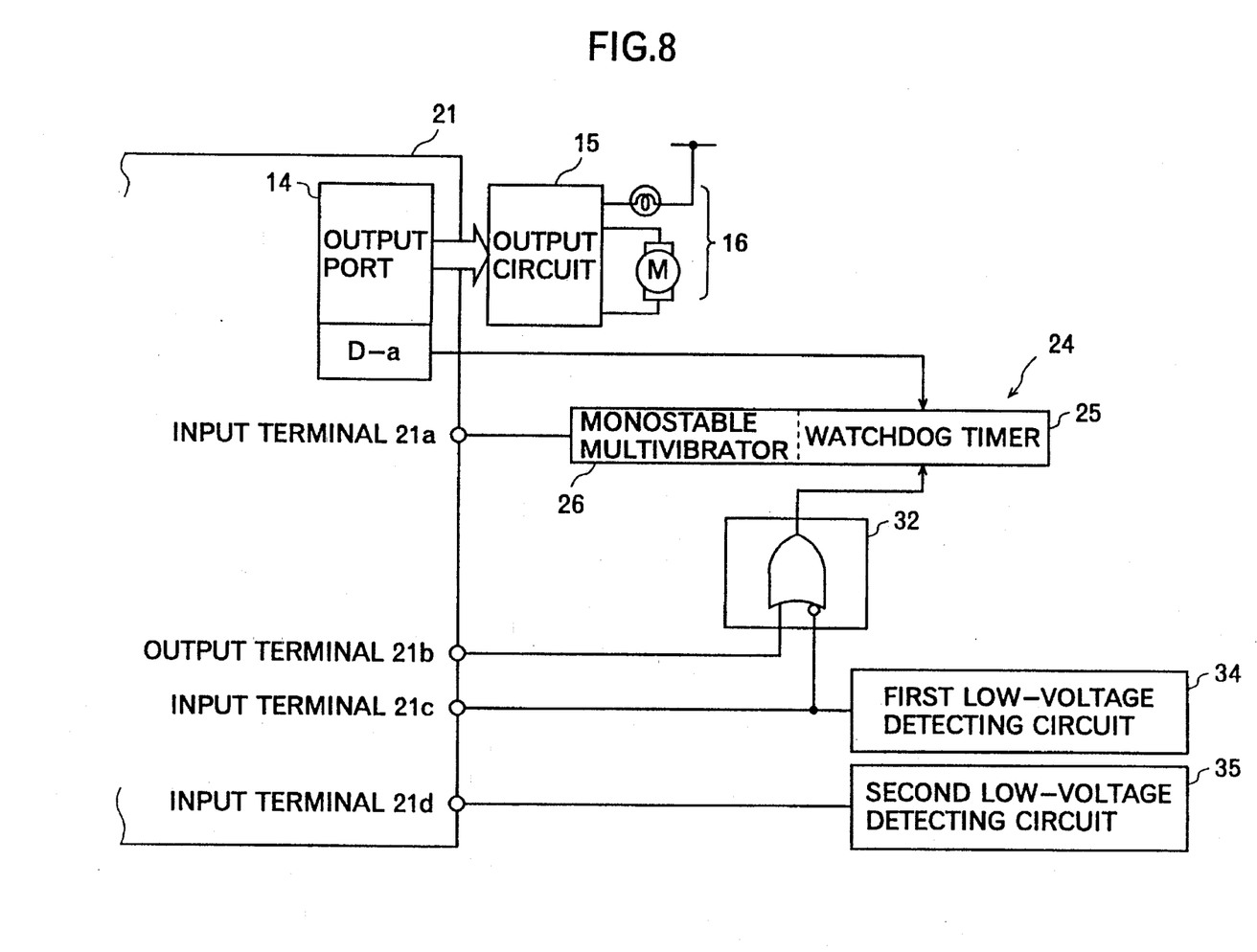
FIG. 8 is a block diagram showing the arrangement of a communication IC and gate circuit in FIG. 6.

FIG. 8 is a block diagram showing the arrangement of the communication IC 21 and gate circuit 32. In FIG. 8, while in sleep mode, the communication IC 21 outputs an "H" (high)-level signal from the output terminal 21b thereof, as in the first embodiment shown in FIG. 1. When supplied with an "L" (low)-level signal through the input terminal 21a, the communication IC 21 changes the state of the output port 14 to the specific state. As mentioned above, the input terminals 21c and 21d serve as reset terminals for resetting the communication control circuit 12 and the output port 14 to their initial state.

The output port D-a forms part of the output port 14, and the output therefrom alternately turns to "H" and "L" levels at predetermined intervals, as in the first embodiment. The output from the output port D-a is supplied to the timer IC 24 including a watchdog timer and a monostable multivibrator. As in the first embodiment, the timer IC 24 monitors the repetition periods of the "H" and "L" levels input thereto by their trailing edges from "H" to "L" level, for example. In the event of abnormality occurring, the timer IC 24 continuously outputs an "L"-level signal.

The gate circuit 32 comprises an OR circuit. This gate circuit 32 performs an OR operation on the output from the output terminal 21b and an inverted signal of the detection output from the first low-voltage detecting circuit 34, and outputs the result of the operation, that is, a reset inhibiting signal, to the timer IC 24. Namely, in this embodiment, when the output terminal 21b provides an "H"-level output which indicates the sleep mode or when the first low-voltage detecting circuit 34 provides an "L"-level detection output which indicates that the power supply voltage is lower than or equal to the set voltage $V_L$, the gate circuit 32 outputs the "H"-level reset inhibiting signal to the timer IC 24. When supplied with the reset inhibiting signal, the timer IC 24 is inhibited from outputting the reset signal (see FIG. D).

Figure 7E:
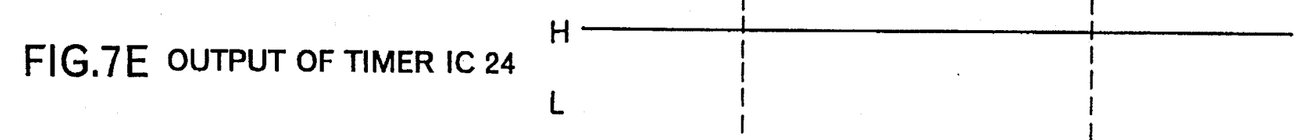
Figure 7F:
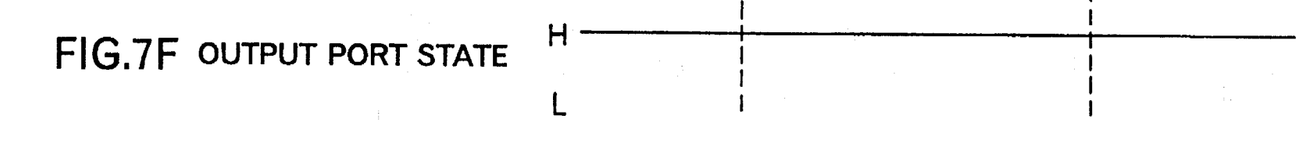

Accordingly, in this embodiment, when the power supply voltage is lower than or equal to the set voltage $V_L$, the communication IC 21 is supplied with an "H"-level signal through the input terminal 21a (see FIG. 7E). As a result, although the communication IC 21 is reset, the output port 14 is not changed to the high-impedance state, as shown in FIG. 7F, whereby the operating state is maintained.

In the second embodiment, the output signal of the watchdog timer is invalidated when the detected power supply voltage is within the range defined by the two set voltages ($V_L \geq$ power supply voltage>$V_R$), during the sleep mode, or when the power supply voltage is low but the output port can provide normal output. Accordingly, the communication control circuit can maintain the operating state without changing the state of the output port to the high-impedance state. Thus, in this embodiment, the loads can be continuously controlled without incurring erroneous operation of the multiplex transmission apparatus.

Although in this embodiment the output from the output port is monitored, data to be monitored is not limited to this and a variety of other data may be monitored instead. For example, the multiplex transmission apparatus may be constructed so that data is monitored before being supplied to the output port, and in the event of abnormality occurring, the data to be supplied to the output port is set to a predetermined value prior to the supply to the output port. In this case, the timer IC may be incorporated in the communication IC.

In order to reduce the electricity consumed during the sleep mode of the multiplex transmission apparatus, the clock for controlling the operation of the communication control circuit may be stopped, for example, and the output port may be held in the state before the stop of the clock. Alternatively, during the sleep mode, the clock frequency for controlling the operation of the communication control circuit may be slowed, for example, and clock pulses may be supplied to only part of the circuitry. In such cases, the sleep mode may be canceled in response to reception of a signal from the transmission line or change in the switch signal supplied to the input port. Even in such sleep mode, since the communication control circuit stops, the reset signal is usually output from the timer IC. The second embodiment can be adapted for such configuration since the output from the output terminal 21b, as well as the output of the first low-voltage detecting circuit 34, is supplied to the timer IC 24 through the gate circuit 32. Thus, the timer IC 24 can be inhibited from outputting the reset signal.

Figure 9:
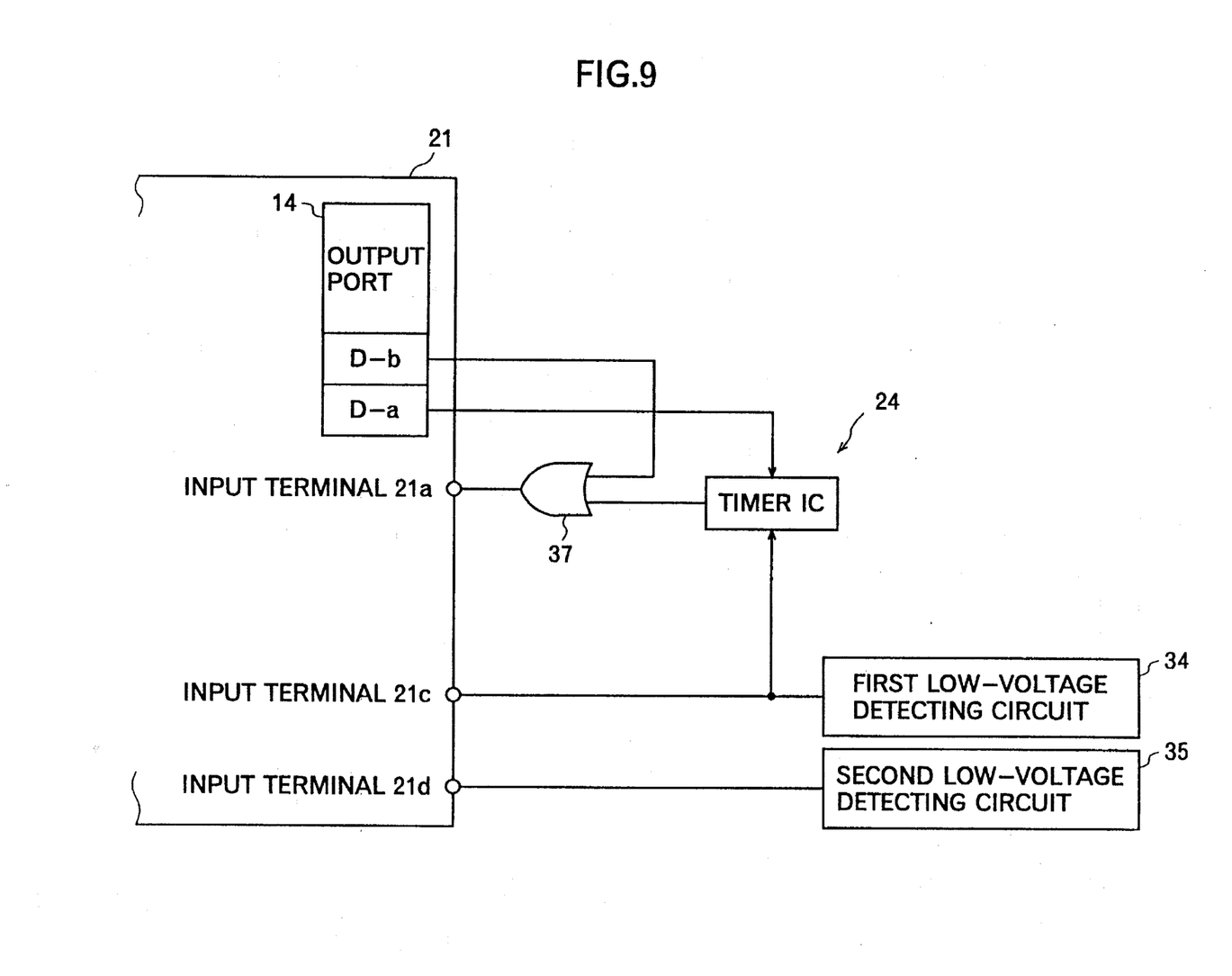
FIG. 9 is a block diagram showing another example of the arrangement of the communication IC and gate circuit.

As another measure during the sleep mode, the signal input to the input terminal 21a may be invalidated by the output signal from the output port D-b (see FIG. 2) which forms part of the output port 14, as shown in FIG. 9. In this case, an OR circuit 37 is supplied with the output of the timer IC 24 and the output from the output port D-b. Before entry into the sleep mode, the output from the output port D-b is fixed at the "H" (high) level and the OR circuit 37 performs an OR operation. Consequently, although the communication IC 21 is reset, the output port 14 remains in operating state.

In the case where this embodiment is applied to a multiplex transmission system for an automotive electrical system, when the ignition key is turned off, for example, another multiplex transmission apparatus connected to the transmission line MB, for example, the apparatus 30 shown in FIG. 6, transmits a frame containing sleep command data to the multiplex transmission apparatus 33. Upon receiving this frame, the communication IC 21 of the multiplex transmission apparatus 33 enters the sleep mode. In this case, the system may follow the below-mentioned data transmission procedure.

First, the apparatus 30, as another multiplex transmission apparatus, transmits a data frame of which data associated with the output port D-b is "H" level. After confirming the reception of the frame by means of ACK signals, the multiplex transmission apparatus 30 transmits a frame containing sleep command data.

When the multiplex transmission apparatus 33 is supplied with the frame containing the sleep command data, the output from the output port D-b is fixed at the "H" level before entry into the sleep mode. Consequently, the output port 14 remains in operating state and erroneous operation of the multiplex transmission apparatus 33 is prevented.

In the embodiment shown in FIG. 6, the signal input to the input terminal 21a is invalidated when the output from the first low-voltage detecting circuit 34 indicates that the power supply voltage is at a level lower than or equal to $V_L$. This invention, however, is not limited to this arrangement, and an arrangement shown in the block diagram of FIG. 10, for example, may be employed.

Figure 10:
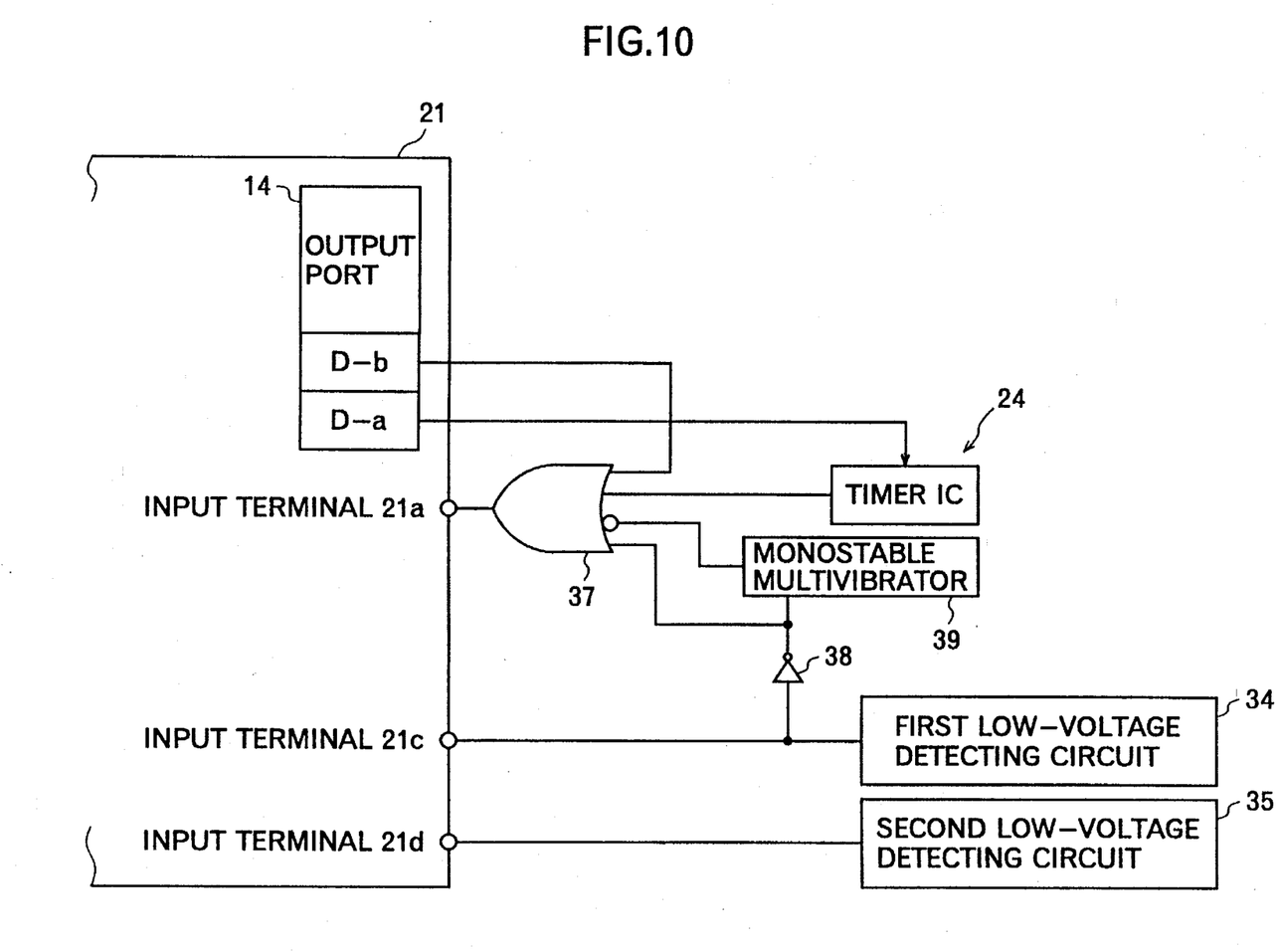
FIG. 10 is a block diagram showing still another example of the arrangement of the communication IC and gate circuit.

In the embodiment shown in FIG. 10, the detection output of the first low-voltage detecting circuit 34 is inverted by an inverter circuit 38 (see FIG. 11F), and the inverted signal is supplied to an OR circuit 37 and a monostable multivibrator 39. The monostable multivibrator 39 supplies the OR circuit 37 with an "L"-level pulse of a suitable length after the time of "H"-to-"L" transition, or the trailing edge, of the signal supplied thereto from the inverter circuit 38 (see FIG. 11G). Also, the monostable multivibrator 39 sets a circuit constant such that the "L"-level pulse has a length of T5.

Figure 11A:
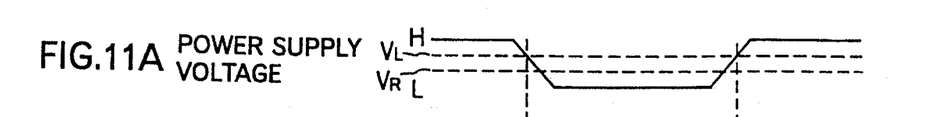
FIGS. 11A to 11H are waveform charts showing outputs from various circuits in FIG. 10.
Figure 11B:
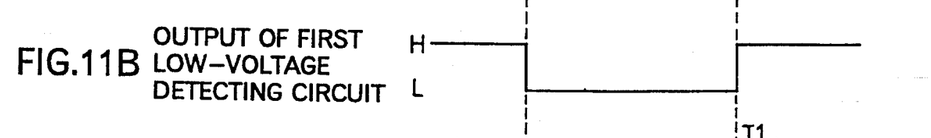
Figure 11C:
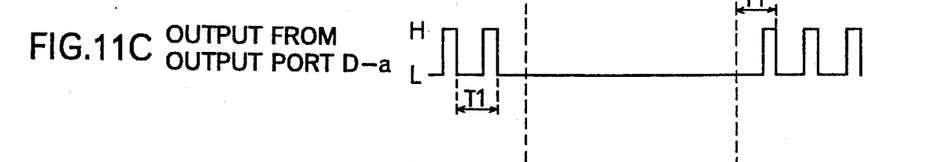
Figure 11D:
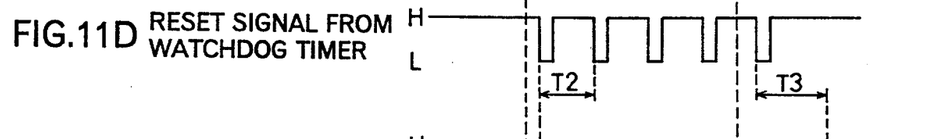
Figure 11E:
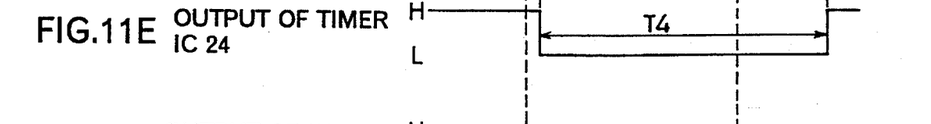
Figures 11F, 11G:
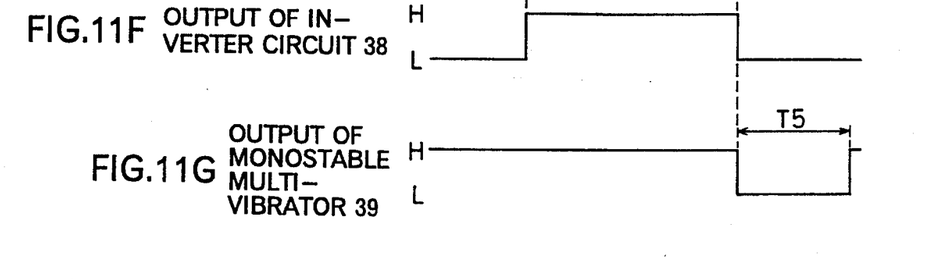

In this embodiment, the output of the inverter circuit 38 and the inverted value of the output of the monostable multivibrator 39 are input to the OR circuit 37, in order to mask the period during which the output of the timer IC 24 is "L" (low) (T4 in FIG. 11E).

Figure 11H:
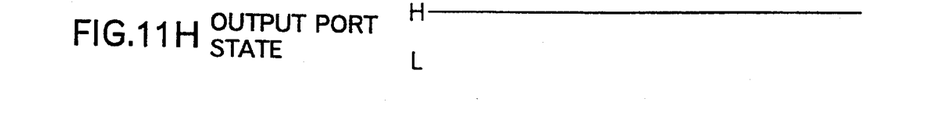

Consequently, even while the output of the timer IC 24 is "L" (low), the OR circuit 37 provides an "H"-level output to the input terminal 21a. Accordingly, the operating state of the output port is maintained (see FIG. 11H), and erroneous operation of the multiplex transmission apparatus is prevented. Also in this embodiment, as a measure during the sleep mode, the signal input to the input terminal 21a may be invalidated by the output signal from the output port D-b before entry into the sleep mode, as in the case described with reference to FIG. 9.

In the foregoing embodiments, the transmission line may be of any topology, such as bus type, ring type, or star type.

What is claimed is:

1. A multiplex transmission apparatus connected to a second multiplex transmission apparatus by a common transmission line to carry out data communications with the second multiplex transmission apparatus, comprising:

power supply means for applying a power supply voltage to individual parts in the multiplex transmission apparatus;

communication control means for controlling reception of frames which are successively transmitted thereto from the second multiplex transmission apparatus and in which at least part of predetermined data shows a predetermined periodic change, and for outputting the predetermined data in received frames to an output port;

state setting means for detecting the power supply voltage, and for setting states of the output port and said communication control means individually to an initial state in accordance with a detection result;

state control means for monitoring at least part of the predetermined data output from the output port, and changing the state of the output port to a predetermined specific state when said at least part of the predetermined data being monitored does not show a predetermined change with respect to corresponding data previously output; and inhibiting means for inhibiting said state control means from changing the state of the output port, in accordance with the detection result derived from said state setting means.

2. The multiplex transmission apparatus according to claim 1, which has operation modes including a power economy mode in which operation of said communication control means is stopped, and a normal operation mode in which said communication control means is operated; and wherein said inhibiting means inhibits the output port from changing to the specific state also when the multiplex transmission apparatus is in the power economy mode.

3. A multiplex transmission apparatus connected to a second multiplex transmission apparatus by a common transmission line to carry out data communications with the second multiplex transmission apparatus, comprising:

power supply means for applying a power supply voltage to individual parts in the multiplex transmission apparatus;

communication control means for controlling reception of frames which are successively transmitted thereto from the second multiplex transmission apparatus and in which at least part of predetermined data shows a predetermined periodic change, and for outputting the predetermined data in received frames to an output port;

first state setting means for detecting a first voltage level of the power supply voltage, and for maintaining an operating state of the output port while changing a state of said communication control means to an initial state in accordance with a detection result;

second state setting means for detecting a second voltage level of the power supply voltage, and for setting states of both the output port and said communication control means to respective initial states in accordance with a detection result;

state control means for monitoring at least part of the predetermined data output from the output port, and changing the state of the output port to a predetermined specific state when said at least part of the predetermined data being monitored does not show a predetermined change with respect to corresponding data previously output; and inhibiting means for inhibiting said state control means from changing the state of the output port, in accordance with the detection result derived from said first state setting means.

4. The multiplex transmission apparatus according to claim 3, wherein said first state setting means determines whether the power supply voltage is at a level lower than or equal to the first voltage level at which said communication control means is unable to operate normally and which is higher than the second voltage level;

said second state setting means determines whether the power supply voltage is at a level lower than or equal to the second voltage level at which neither the output port nor said communication control means can operate normally; and said inhibiting means inhibits said state control means from changing the state of the output port when the power supply voltage is higher than or equal to the second voltage level and also lower than or equal to the first voltage level.

5. The multiplex transmission apparatus according to claim 3, which has operation modes including a power economy mode in which operation of said communication control means is stopped, and a normal operation mode in which said communication control means is operated; and wherein said inhibiting means inhibits the output port from changing to the specific state also when the multiplex transmission apparatus is in the power economy mode.

6. A multiplex transmission apparatus connected to a second multiplex transmission apparatus by a common transmission line to carry out data communications with the second multiplex transmission apparatus, and having operation modes including a power economy mode and a normal operation mode, the multiplex transmission apparatus comprising:

power supply means for applying a power supply voltage to individual parts in the multiplex transmission apparatus;

communication control means, operation of which is stopped during the power economy mode to reduce electric current consumption, and which is operated during the normal operation mode by the power supply voltage applied thereto from said power supply means, said communication control means controlling reception of frames which are successively transmitted thereto from the second multiplex transmission apparatus and in which at least part of predetermined data shows a predetermined periodic change, and outputting the predetermined data in received frames to an output port; and inhibiting means for inhibiting the output port from changing to a predetermined specific state during the power economy mode.

* * * * *